United States Patent
Chino et al.

(10) Patent No.: US 12,017,606 B2
(45) Date of Patent: Jun. 25, 2024

(54) VEHICLE BODY REAR STRUCTURE

(71) Applicant: HONDA MOTOR CO., LTD., Tokyo (JP)

(72) Inventors: Shungo Chino, Tokyo (JP); Takashi Nitta, Tokyo (JP); Yusuke Nakamura, Tokyo (JP); Ryo Takabu, Tokyo (JP); Takuma Mashiko, Utsunomiya (JP); Takamitsu Kasai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/158,808

(22) Filed: Jan. 24, 2023

(65) Prior Publication Data
US 2023/0242065 A1 Aug. 3, 2023

(30) Foreign Application Priority Data
Jan. 28, 2022 (JP) .................. 2022-012370

(51) Int. Cl.
*B60R 22/24* (2006.01)
*B60R 22/34* (2006.01)
(Continued)

(52) U.S. Cl.
CPC .............. *B60R 22/24* (2013.01); *B60R 22/34* (2013.01); *B62D 25/04* (2013.01); *B62D 25/08* (2013.01)

(58) Field of Classification Search
CPC . B60R 2022/3402; B60R 22/24; B60R 22/34; B62D 25/02; B62D 25/04; B62D 25/08; B62D 25/088
See application file for complete search history.

(56) References Cited

U.S. PATENT DOCUMENTS 5,127,666 A * 7/1992 Fujinaka ............. B60G 3/202
280/124.153
6,773,048 B1 * 8/2004 Freeman ............. B60N 2/0224
280/808
(Continued)

FOREIGN PATENT DOCUMENTS

CN   113353151 A  *  9/2021
EP    1449747 A2  *  8/2004  ............ B60R 22/24
(Continued)

OTHER PUBLICATIONS

Japanese Office Action received in corresponding Japanese application No. 2022-012370 dated Jul. 4, 2023 with English translation (8 pages).

*Primary Examiner* — Laura Freedman
(74) *Attorney, Agent, or Firm* — Rankin, Hill & Clark LLP (57) ABSTRACT

A vehicle body rear structure includes: a rear wheel house; a rear cross member located on a vehicle width direction inner side of a lower portion of the rear wheel house and extending in a vehicle width direction; a pillar extending upward from an upper portion of the rear wheel house; a wheel house reinforcing member extending along the rear wheel house and connecting between the rear cross member and the pillar; a retractor functioning as a seat belt winding device; and a bracket configured to fix the retractor to a vehicle body. The bracket has one end portion connected to the wheel house reinforcing member. The bracket has another portion extending from the one end portion in the vehicle forward direction or in the vehicle rearward direction and connected to the rear wheel house.

7 Claims, 4 Drawing Sheets

(51) Int. Cl.
   *B62D 25/04* (2006.01)
   *B62D 25/08* (2006.01)

(56) References Cited

U.S. PATENT DOCUMENTS

| | | | | |
|---|---|---|---|---|
| 7,364,225 | B2 * | 4/2008 | Tomioka | B62D 25/08 |
| | | | | 296/203.04 |
| 8,267,468 | B2 * | 9/2012 | Amir | B62D 25/087 |
| | | | | 296/193.08 |
| 8,511,731 | B2 * | 8/2013 | Sakai | B62D 25/02 |
| | | | | 296/203.04 |
| 8,696,050 | B2 * | 4/2014 | Nakamura | B60R 22/18 |
| | | | | 296/193.06 |
| 9,162,710 | B1 * | 10/2015 | Yamamoto | B62D 25/2027 |
| 9,187,130 | B2 * | 11/2015 | Katou | B62D 25/087 |
| 9,365,184 | B2 * | 6/2016 | Isayama | B60R 22/1951 |
| 9,517,749 | B2 * | 12/2016 | Iguchi | B60R 22/341 |
| 10,059,300 | B2 * | 8/2018 | Shahidi | B60R 22/34 |
| 10,308,288 | B2 * | 6/2019 | Kiyoshita | B62D 25/088 |
| 10,906,591 | B2 * | 2/2021 | Ogawa | B62D 25/088 |
| 11,192,591 | B2 * | 12/2021 | Sato | B62D 25/2036 |
| 11,192,594 | B2 * | 12/2021 | Ishimoto | B62D 25/20 |
| 11,745,697 | B2 * | 9/2023 | Muraoka | B60R 22/34 |
| | | | | 280/788 |
| 2007/0085368 | A1 * | 4/2007 | Hirokawa | B60N 2/366 |
| | | | | 296/65.16 |
| 2014/0158567 | A1 | 6/2014 | Park et al. | |
| 2023/0242182 | A1 * | 8/2023 | Chino | B62D 25/2027 |
| | | | | 296/193.08 |

FOREIGN PATENT DOCUMENTS

| | | | | |
|---|---|---|---|---|
| EP | 2 824 017 A1 | | 1/2015 | |
| JP | H0585303 A | * | 4/1993 | |
| JP | H08175424 A | * | 7/1996 | |
| JP | 2004268806 A | * | 9/2004 | |
| JP | 2005119407 A | * | 5/2005 | |
| JP | 2005170228 A | * | 6/2005 | |
| JP | 2006-160016 A | | 6/2006 | |
| JP | 2006193047 A | * | 7/2006 | |
| JP | 2007038983 A | * | 2/2007 | |
| JP | 2009113572 A | * | 5/2009 | |
| JP | 2009126197 A | * | 6/2009 | B62D 25/087 |
| JP | 2009-298168 A | | 12/2009 | |
| JP | 2011-161937 A | | 8/2011 | |
| JP | 2011235836 A | * | 11/2011 | |
| JP | 2016052827 A | * | 4/2016 | |
| JP | 2016112991 A | * | 6/2016 | |
| WO | 2013/132888 A1 | | 9/2013 | |
| WO | WO-2019157746 A1 | * | 8/2019 | |
| WO | WO-2020099754 A1 | * | 5/2020 | B60R 22/24 |

* cited by examiner

VEHICLE BODY REAR STRUCTURE

CROSS REFERENCE TO RELATED APPLICATIONS

This application claims the benefit of Japanese Patent Application No. 2022-012370 filed on Jan. 28, 2022, the disclosure of which is incorporated herein by reference.

TECHNICAL FIELD

The present invention relates to a vehicle body rear structure of a vehicle.

BACKGROUND ART

In recent years, there is a demand of reducing fuel consumption in view of improving the globe environment to reduce natural disasters. On the other hand, there is also a demand of preserving or improving the collision safety of vehicles. In order to satisfy these demands, development of a high-strength and light-weight vehicle body rear structure is in progress.

Japanese Laid-Open Patent Application Publication No. 2011-161937 (hereinafter referred to as Patent Document 1) discloses a vehicle body rear structure in which a wheel house reinforcing member is disposed on an upper face of a wheel house and the wheel house reinforcing member has a front face to which a retractor is attached.

RELATED ART DOCUMENT

Patent Document

[Patent Document 1] Japanese Laid-Open Patent Application, Publication No. 2011-161937

SUMMARY

According to the structure disclosed in Patent Document 1, as the retractor is attached to the front face of the wheel house reinforcing member, the structure limits the degree of freedom in the design of the retractor, such as arrangement and an attachment angle. Moreover, when the wheel house reinforcing member is designed prioritizing suitable arrangement of the retractor, the load transmission efficiency of the wheel house reinforcing member serving as a structural member is lowered. In such a case, the wheel house reinforcing member needs to be strengthened, leading to an increase in the weight.

The present invention has been made in view of the above-described problems, and it is an object of the present invention to provide a vehicle body rear structure with which it is possible to improve the degree of freedom in the design of the retractor, ensure the attachment strength of the retractor, and reduce the weight.

According to one embodiment of the present disclosure, a vehicle body rear structure includes: a rear wheel house; a rear cross member located on a vehicle width direction inner side of a lower portion of the rear wheel house and extending in a vehicle width direction; a pillar extending upward from an upper portion of the rear wheel house; a wheel house reinforcing member extending along the rear wheel house and connecting between the rear cross member and the pillar; a retractor functioning as a seat belt winding device; and a bracket configured to fix the retractor to a vehicle body. The bracket has one end portion connected to the wheel house reinforcing member. The bracket has another portion extending from the one end portion in the vehicle forward direction or in the vehicle rearward direction and connected to the rear wheel house.

The embodiment makes it possible to improve the degree of freedom in the design of the retractor, ensure the attachment strength of the retractor, and reduce the weight.

DETAILED DESCRIPTION

Hereinafter, a vehicle body rear structure of an embodiment according to the present invention will be described in detail with reference to the drawings as appropriate, for a case in which the vehicle body rear structure is applied to the left portion of a vehicle. Note that in the drawings, "front" and "rear" respectively represents forward and rearward directions i.e., vehicle front-rear directions, with respect to the advancing direction of the vehicle; and "left" and "right" respectively represents left and right directions (vehicle width directions) as seen from the driver's seat.

Figure 1:
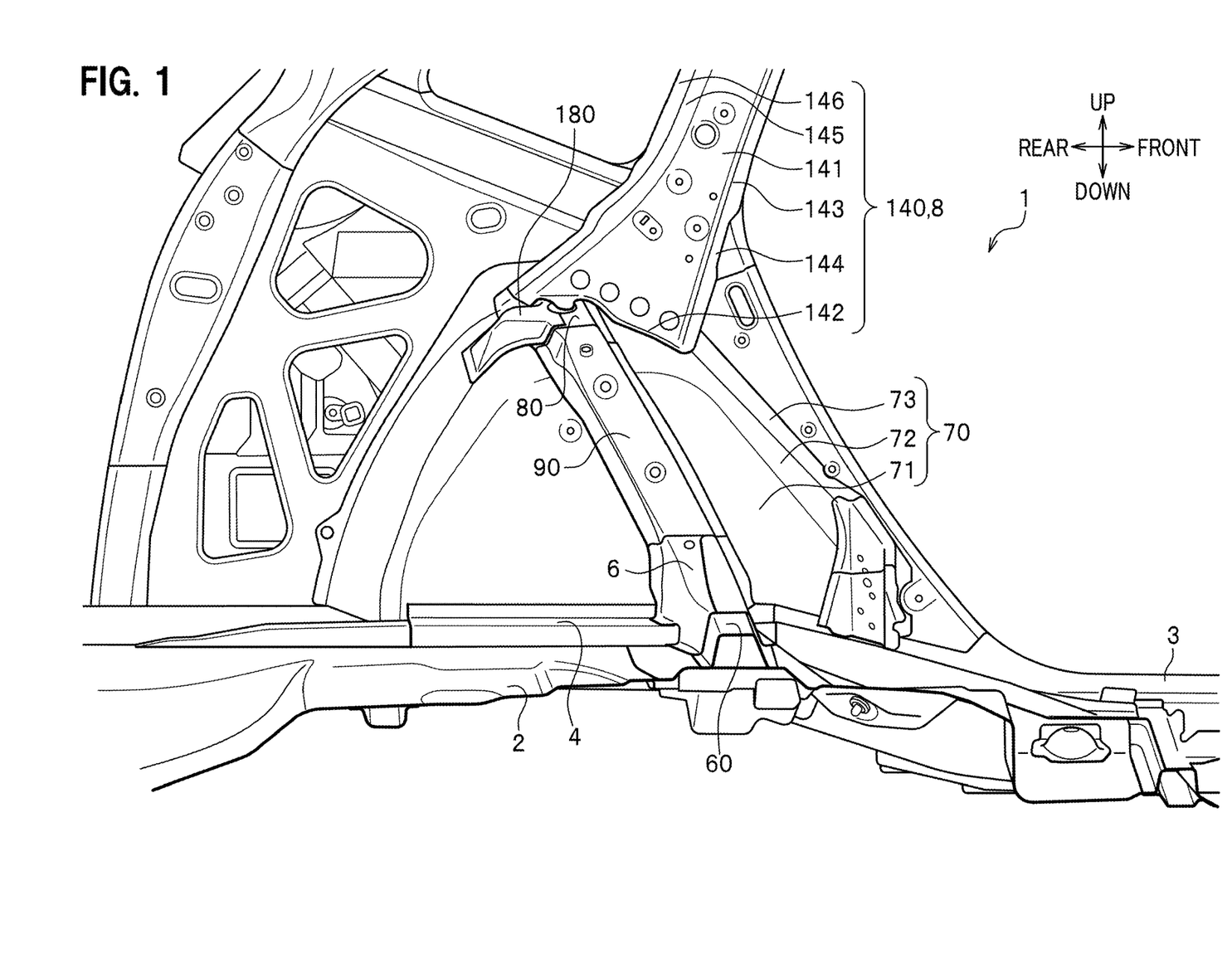
FIG. 1 is a side view schematically illustrating a vehicle body rear structure according to an embodiment of the present invention.

As illustrated in FIG. 1, a vehicle body rear structure 1 according to the embodiment includes, as metal structural members of the vehicle body, a floor panel 2, a side sill 3, a rear frame (not illustrated), an upper stiffener 4, and a rear cross member 60. The rear frame is a member (rear frame lower part) that constitutes a lower portion of a frame (rear frame) having a rectangular closed cross section and extending in the vehicle front-rear direction. The upper stiffener 4 is a member (rear frame upper part) that constitutes an upper portion of the frame having the rectangular closed cross section. The vehicle body rear structure 1 further includes, as a metal structural member of the vehicle body, a rear wheel house 70 having a damper base 5 (see FIG. 3) inside.

The vehicle body rear structure 1 further includes, as metal structural members of the vehicle body, a wheel house upper part reinforcing member 80, a wheel house side part reinforcing member 90, a connecting member 6, and a pillar 8. The wheel house upper part reinforcing member 80, the wheel house side part reinforcing member 90, and the connecting member 6 are connected to constitute a wheel house reinforcing member that reinforces the rear wheel house 70.

Figure 2:
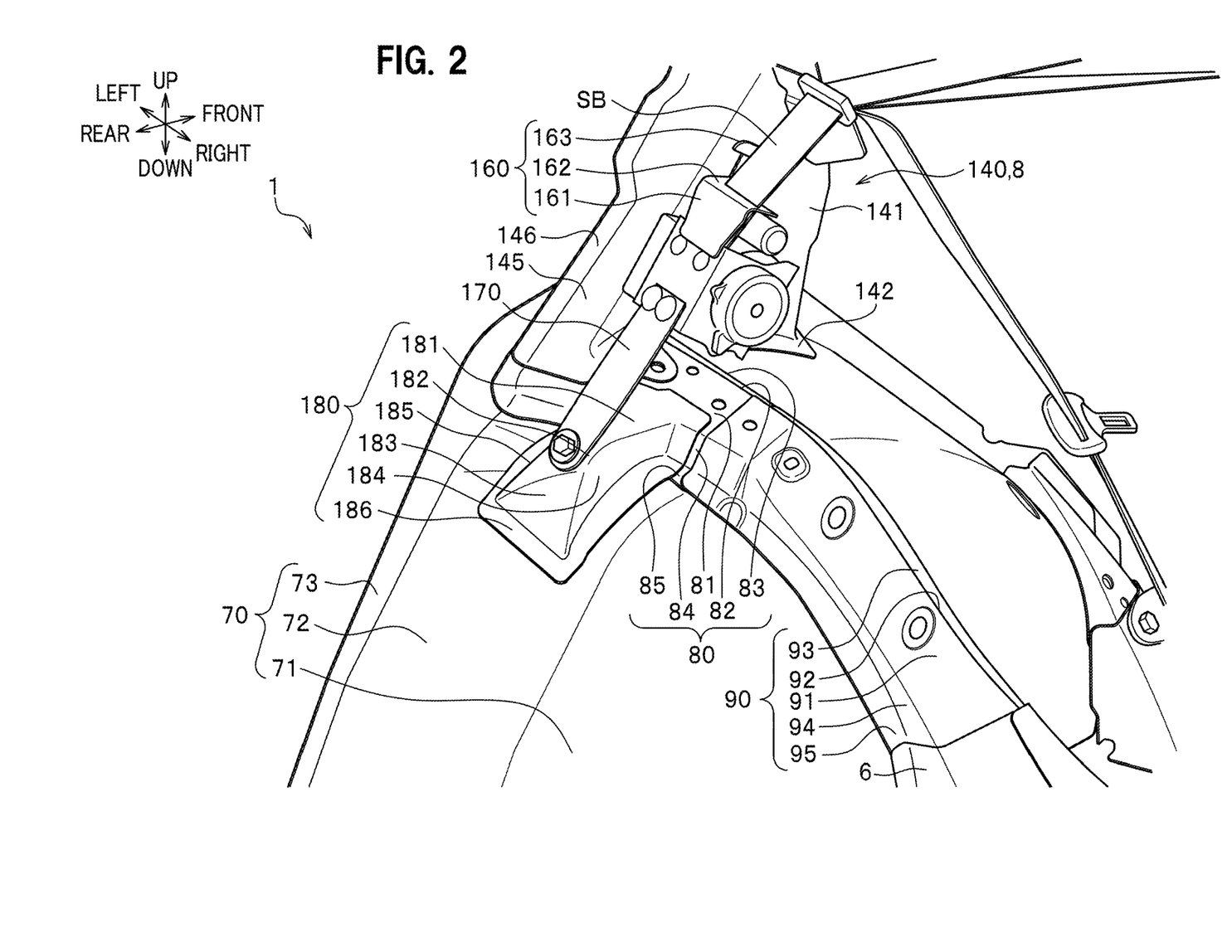
FIG. 2 is a partially enlarged view of the vehicle body rear structure illustrated in FIG. 1 and is a perspective view for describing a retractor and a bracket.

As illustrated in FIG. 2, the vehicle body rear structure 1 further includes a retractor 150 functioning as a seat belt winding device and includes a front stay 160, a rear stay 170, and a bracket 180, as members supporting the retractor 150.

Floor Panel

As illustrated in FIG. 1, the floor panel 2 is a plate-like member included in the floor of the vehicle body. The floor panel 2 is bridged between a pair of left and right side sills 3,3, between a pair of left and right rear frames, and between a pair of left and right upper stiffeners 4,4.

Side Sill

The side sill 3 is a rectangular closed cross-section member extending in the front-rear direction in a portion located in a vehicle width direction end portion of the vehicle body and located in a front-rear direction intermediate portion of the vehicle body.

Rear Frame

The rear frame defines a cross section having a hat-like shape and extends in the front-rear direction in a portion located in a vehicle width direction end portion of the vehicle body and located in a rearward portion of the vehicle body. The rear frame defines an opening in an upper portion.

Upper Stiffener

The upper stiffener (rear frame upper part) 4 is a plate-like member extending in the front-rear direction in a portion located in a vehicle width direction end portion of the vehicle body and located in a rearward portion of the vehicle body. The upper stiffener 4 is disposed so as to cover the opening of the rear frame and defines a rectangular closed cross section together with the rear frame.

Rear Cross Member

The rear cross member 60 is a member that defines a cross section having a hat-like shape and extends in the vehicle width direction on the floor panel 2. The rear cross member 60 defines an opening in a lower portion. The rear cross member 60 defines a rectangular closed cross section together with the floor panel 2.

Rear Wheel House

The rear wheel house 70 houses a not-shown rear wheel. The rear wheel house 70 includes: a side wall portion 71 having an upwardly convex, approximately circular disk shape in side view; a periphery wall portion 72 extending outward in the vehicle width direction from an arc-shaped end portion of the side wall portion 71 and having an arc shape in side view; and a flange portion 73 extending outward in the radial direction from a radially outer end portion of the periphery wall portion 72, which are monolithically formed with the rear wheel house 70.

A forward portion of a lower end portion of the side wall portion 71 is put on a vehicle width direction outer side of a flange portion formed on a vehicle width direction outer end portion of the upper stiffener 4 and is joined to upper stiffener 4 by welding or the like.

Damper Base

Figure 3:
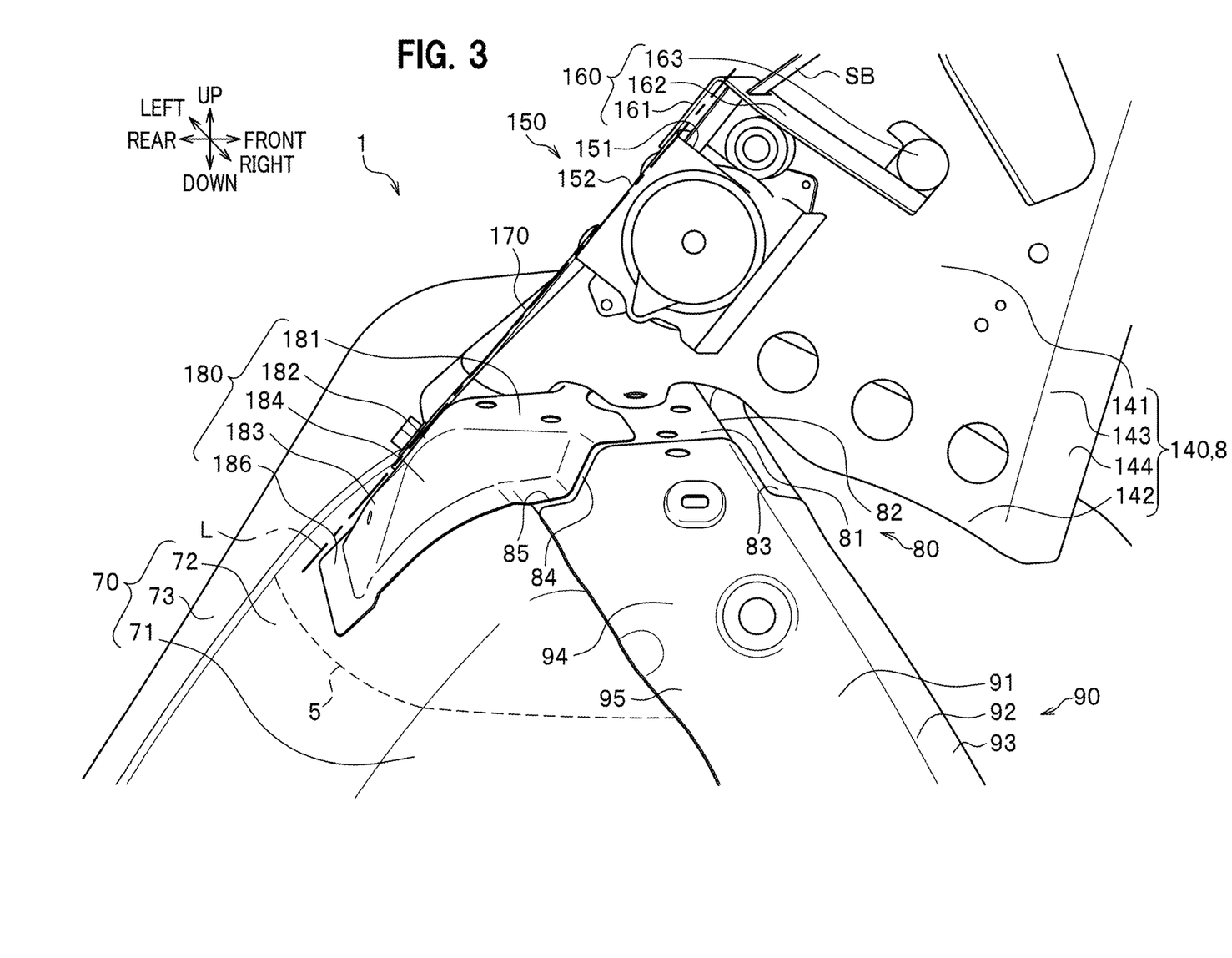
FIG. 3 is another partially enlarged view of the vehicle body rear structure illustrated in FIG. 1 and is a side view for describing the retractor and the bracket.

As illustrated in FIG. 3, the damper base 5 is disposed in a space defined on the vehicle outer side by the side wall portion 71 and the periphery wall portion 72 of the rear wheel house 70 and is a curved plate-like member that supports an upper end portion of a suspension damper (not illustrated) that suspends a vehicle wheel in the space. The damper base 5 is joined, by welding or the like, to a lower face of an upper end portion of the periphery wall portion 72 of the rear wheel house 70 and to the vehicle width direction outer face of the side wall portion 71 of the rear wheel house 70.

Wheel House Upper Part Reinforcing Member

As illustrated in FIG. 1, the wheel house upper part reinforcing member 80 defines a rectangular closed cross section together with an upper portion (periphery wall portion 72) of the rear wheel house 70, thereby to reinforce the upper portion of the rear wheel house 70. As illustrated in FIG. 2, the wheel house upper part reinforcing member 80 includes: an upper wall portion 81; a front wall portion 82 extending downward from a front end portion of the upper wall portion 81; and a front flange portion 83 extending forward from a lower end portion of the front wall portion 82, which are monolithically formed with the wheel house upper part reinforcing member 80. The wheel house upper part reinforcing member 80 further includes: a rear wall portion 84 extending downward from a rear end portion of the upper wall portion 81; and a rear flange portion 85 extending rearward from a lower end portion of the rear wall portion 84, which are monolithically formed with the wheel house upper part reinforcing member 80.

The front flange portion 83 and the rear flange portion 85 are put on the upper side of the periphery wall portion 72 and are joined to the periphery wall portion 72 by welding or the like.

Wheel House Side Part Reinforcing Member

As illustrated in FIG. 1, the wheel house side part reinforcing member 90 defines a rectangular closed cross section together with the side wall portion 71 of the rear wheel house 70, thereby to reinforce the side portion of the rear wheel house 70. As illustrated in FIG. 2, the wheel house side part reinforcing member 90 includes: an inner wall portion 91; a front wall portion 92 extending outward in the vehicle width direction from a front end portion of the inner wall portion 91; and a front flange portion 93 extending forward from a vehicle width direction outer end portion of the front wall portion 92, which are monolithically formed with the wheel house side part reinforcing member 90. The wheel house side part reinforcing member 90 further includes: a rear wall portion 94 extending outward in the vehicle width direction from a rear end portion of the inner wall portion 91; and a rear flange portion 95 extending rearward from a vehicle width direction outer end portion of the rear wall portion 94, which are monolithically formed with the wheel house side part reinforcing member 90.

The front flange portion 93 and the rear flange portion 95 are put on the vehicle width direction inner side of the side wall portion 71 and are joined to the side wall portion 71 by welding or the like.

Connecting Member

As illustrated in FIG. 1, the connecting member 6 connects between a vehicle width direction end portion of the rear cross member 60 and a lower end portion of the wheel house side part reinforcing member 90.

A closed cross section defined together by the floor panel 2 and the rear cross member 60, a closed cross section defined together by the floor panel 2, the connecting member 6, the upper stiffener 4, and the rear wheel house 70, and a closed cross section defined together by the wheel house side part reinforcing member 90 and the rear wheel house 70 are continuously defined.

Pillar

As illustrated in FIG. 1, the pillar 8 is a rectangular closed cross-section member that extends in the up-down direction between the rear wheel house 70 and the roof panel that includes the ceiling of the vehicle body. The pillar 8 is formed by combining a pillar inner part 140 that constitutes a vehicle width direction inner portion of the pillar 8 and a pillar outer part (a not-illustrated panel that forms a side face of the vehicle body) that constitutes a vehicle width direction outer portion of the pillar 8.

Pillar Inner Part

The pillar inner part 140 includes: an inner wall portion 141; and a lower flange portion 142 extending inward in the vehicle width direction from a lower end portion of the inner wall portion 141, which are monolithically formed with the pillar inner part 140. The pillar inner part 140 further includes: a front wall portion 143 extending outward in the vehicle width direction from a front end portion of the inner wall portion 141; and a front flange portion 144 extending forward from a vehicle width direction outer end portion of the front wall portion 143, which are monolithically formed with the pillar inner part 140. The pillar inner part 140 further includes: a rear wall portion 145 extending outward in the vehicle width direction from a rear end portion of the inner wall portion 141; and a rear flange portion 146 extending rearward from a vehicle width direction outer end portion of the rear wall portion 145, which are monolithically formed with the pillar inner part 140.

The lower flange portion 142 is put on the upper side of the periphery wall portion 72 of the rear wheel house 70 and on the upper side of the upper wall portion 81 of the wheel house upper part reinforcing member 80, and is joined to the periphery wall portion 72 and to the upper wall portion 81 by welding or the like. The front flange portion 144 is put on the vehicle width direction inner side of the pillar outer part and is joined to the pillar outer part by welding or the like. The rear flange portion 146 is put on the vehicle width direction inner side of the pillar outer part and is joined to the pillar outer part by welding or the like.

Retractor

As illustrated in FIGS. 2 and 3, the retractor 150 is a seat belt winding device by which a seat belt SB for a rear seat is retracted by being wound and from which the seat belt SB can be withdrawn. The retractor 150 includes a resin or metal housing into which one end portion of the seat belt SB is housed in a state of having been wound around a roller. The housing of the retractor 150 includes an upper wall portion 151 having an opening through which the seat belt SB passes. The upper wall portion 151 slopes downward as it extends forward. The housing of the retractor 150 includes a rear wall portion 152 which slopes downward as it extends rearward. The rear wall portion 152 has a retractor side attachment face to which the rear stay 170 is attached Front Stay The front stay 160 is a resin or metal plate-like member attached to and between the retractor 150 and the pillar 8 to support the retractor 150 with respect to the vehicle body. The front stay 160 includes: a rearward portion 161 extending obliquely upward in the forward direction; a forward portion 162 extending obliquely downward in the forward direction from a front end portion of the rearward portion 161; and an extension portion 163 extending upward from a vehicle width direction outer end portion of a front end portion of the forward portion 162, which are monolithically formed with the front stay 160.

A rear end portion of the rearward portion 161 is fixed to the rear wall portion 152 of the retractor 150 with a bolt or the like. The forward portion 162 has a hole through which the seat belt SB passes. The extension portion 163 is fixed to the inner wall portion 141 of the pillar inner part 140 with a bolt or the like.

Rear Stay

The rear stay 170 is a resin or metal, relatively long plate-like member attached to and between the retractor 150 and the bracket 180 to support the retractor 150 with respect to the vehicle body. A front end portion of the rear stay 170 is fixed to the rear wall portion 152 of the retractor 150 with a bolt or the like. A rear end portion of the rear stay 170 is fixed to an inclined wall portion 182 of the bracket 180 with a bolt or the like.

Vehicle width direction opposite edge portions of the rear stay 170 each have a linear shape in plan view and in side view.

Bracket

Figure 4:
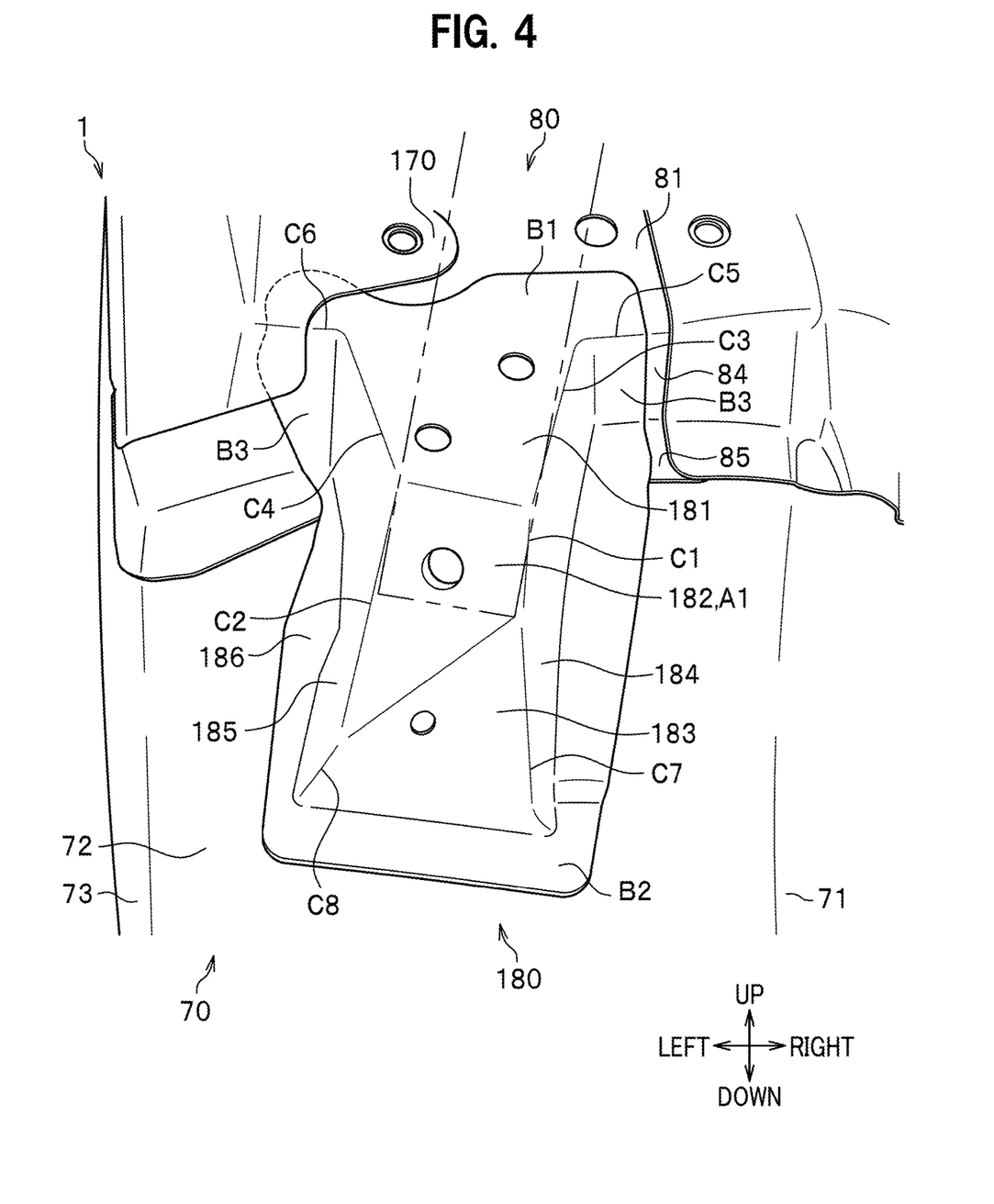
FIG. 4 is a rear view schematically illustrating the bracket.

The bracket 180 is a metal pedestal member disposed on the rear wheel house 70 so as to overlap the wheel house upper part reinforcing member 80, to support the retractor 150 with respect to the vehicle body. As illustrated in FIG. 4, the bracket 180 includes: an upper wall portion 181, the inclined wall portion 182, which extends obliquely downward in the rear direction from a rear end portion of the upper wall portion 181; and a rear wall portion 183 extending downward from a rear end portion of the inclined wall portion 182, which are monolithically formed with the bracket 180. The bracket 180 further includes: an inner wall portion 184 extending downward from vehicle width direction inner end portions of the upper wall portion 181, the inclined wall portion 182, and the rear wall portion 183; and an outer wall portion 185 extending downward from vehicle width direction outer end portions of the upper wall portion 181, the inclined wall portion 182, and the rear wall portion 183, which are monolithically formed with the bracket 180. The bracket 180 further includes a flange portion 186 monolithically formed therewith so as to surround the above-described portions.

According to the present embodiment, the bracket 180 is, at a front end portion thereof, connected to the wheel house upper part reinforcing member 80; at another portion of the bracket 180 other than the front end portion, the rear stay 170 is attached to the bracket 180; and the bracket 180 is connected to the rear wheel house 70. The front end portion of the bracket 180 has the below-described first connecting face B1 and third connecting faces B3, and the other portion of the bracket 180 has the below-described attachment face A1 and second connecting face B2.

The inclined wall portion 182 is the attachment face A1, to which the rear end portion of the rear stay 170 is attached. The attachment face A1 is approximately in the same angle with the rear wall portion 152, which is the retractor side attachment face. The attachment face A1 and the rear wall portion 152 are approximately on the same virtual line L (see FIG. 3) in side view.

Ridgelines C1, C2, which are located at vehicle width direction opposite edge portions of the inclined wall portion 182, each have a linear shape in plan view and in side view. The ridgelines C1, C2 extend in the same direction as the direction in which the rear stay 170 extends (direction of a virtual line connecting between the rear wall portion 152 of the retractor 150 and the attachment face A1). The width-direction dimension of the attachment face A1 (distance between the inner wall portion 184 and the outer wall portion 185) is approximately the same as the width-direction dimension of the rear stay 170. With this configuration, it is possible to align the ridgelines C1 and C2 on the vehicle width direction edges of the attachment face A1 with the positions of the width direction edges of the rear stay 170, thereby to reduce deformation caused in the attachment face A1 due to a load inputted from the retractor 150 via the rear stay 170 to the attachment face A1

The flange portion 186 defines a continuous face formed along the entire periphery of the bracket 180 so as to surround the entire periphery of the attachment face A1 and is a connecting face connected to the wheel house upper part reinforcing member 80 and to the rear wheel house 70. The connecting face is joined to the wheel house upper part reinforcing member 80 and to the rear wheel house 70 by welding or the like.

A front end portion of the flange portion 186 is a portion extending forward from the upper wall portion 181 and is a first connecting face B1 connected to the upper wall portion 81 of the wheel house upper part reinforcing member 80.

A rearward portion of the flange portion 186 is a second connecting face B2 connected to the periphery wall portion 72 of the rear wheel house 70. The second connecting face B2 is also connected via the rear wheel house 70 to the damper base 5 (three-tier welding).

The flange portion 186 has third connecting faces B3, which are located in a front-rear direction intermediate portion of the flange portion 186 and are located rearwardly of the first connecting face B1, and which are connected to the rear wall portion 84 of the wheel house upper part reinforcing member 80.

The front-rear direction intermediate portion of the flange portion 186 includes portions which are located between the third connecting faces B3 and the second connecting face B2 and which are connected to the rear flange portion 85 of the wheel house upper part reinforcing member 80.

The bracket 180 has ridgelines C3 and C4 that are defined between the attachment face A1, the first connecting face B1, and the third connecting face B3 and connect them. The first connecting face B1 and the third connecting faces B3 define ridgelines C5 and C6 therebetween. The ridgeline C3 extends along the boundary between the upper wall portion 181 and the inner wall portion 184 and has a linear shape in plan view and in side view. The ridgeline C4 extends along the boundary between the upper wall portion 181 and the outer wall portion 185 and has a linear shape in plan view and in side view. The ridgelines C5 and C6 are superposed on a ridgeline formed between the upper wall portion 81 and the rear wall portion 84 of the wheel house upper part reinforcing member 80.

The ridgelines C3 and C4 transmit a load inputted from the retractor 150 via the rear stay 170 to the attachment face A1 to the wheel house upper part reinforcing member 80 via the first connecting face B1 and the third connecting faces B3 That means, as the ridgelines C3 and C4 distribute the load inputted to the attachment face A1 to the wheel house upper part reinforcing member 80, it is possible to reduce the weight of the bracket 180. The ridgelines C3 and C4 transmit a load inputted from the retractor 150 via the rear stay 170 to the attachment face A1 to a ridgeline formed between the upper wall portion 81 and the rear wall portion 84 of the wheel house upper part reinforcing member 80 via the first connecting face B1 and the third connecting faces B3. That means, the ridgelines C3 and C4 contribute to supporting the retractor 150 firmly because they distribute the load inputted to the attachment face A1 to the ridgeline of the wheel house upper part reinforcing member 80.

The bracket 180 has ridgelines C7 and C8 that are formed between the attachment face A1 and the second connecting face B2 and that connect them. The ridgeline C7 extends along the boundary between the rear wall portion 183 and the inner wall portion 184 and has a linear shape in plan view and in side view. The ridgeline C8 extends along the boundary between the rear wall portion 183 and the outer wall portion 185 and has a linear shape in plan view and in side view.

The ridgelines C7 and C8 transmit a load inputted from the retractor 150 via the rear stay 170 to the attachment face A1 to the rear wheel house 70 via the second connecting face B2. As the ridgelines C7 and C8 distribute the load inputted to the attachment face A1 to the rear wheel house 70, it is possible to reduce the weight of the bracket 180.

A vehicle body rear structure 1 according to an embodiment of the present invention includes: a rear wheel house 70; a rear cross member 60 located on the vehicle width direction inner side of a lower portion of the rear wheel house 70 and extending in a vehicle width direction; a pillar 8 extending upward from an upper portion of the rear wheel house 70; a wheel house reinforcing member extending along the rear wheel house 70 and connecting between the rear cross member 60 and the pillar 8; a retractor 150 functioning as a seat belt winding device; and a bracket 180 configured to fix the retractor 150 to the vehicle body. The bracket 180 has one end portion connected to the wheel house reinforcing member. The bracket 180 has another portion extending from the one end portion in the vehicle forward direction or in the vehicle rearward direction and connected to the rear wheel house 70.

With this configuration, the vehicle body rear structure 1 allows for more freedom in the design of the retractor 150, such as arrangement and an attachment angle, compared to a structure in which the retractor 150 is attached directory to the wheel house reinforcing member.

Moreover, as the one end portion of the bracket 180 is connected to the wheel house reinforcing member, the vehicle body rear structure 1 distributes a load transmitted from the retractor 150 to the bracket 180 to the rear cross member 60 and to the pillar 8 via the wheel house reinforcing member. This makes it possible to, while ensuring a suitable attachment strength of the retractor 150, reduce the weight of the wheel house reinforcing member.

The vehicle body rear structure 1 further includes a damper base 5 disposed on the vehicle outer side of the rear wheel house 70. The other portion of the bracket 180 is connected to the damper base 5 via the rear wheel house 70.

Consequently, the vehicle body rear structure 1 distributes the load transmitted from the retractor 150 to the bracket 180 also to the damper base 5. This makes it possible to reduce the weight of the bracket 180.

The vehicle body rear structure 1 further includes a stay connecting between the bracket 180 and the retractor 150. The bracket 180 has an attachment face A1 which is formed on the other portion of the bracket 180 and to which the stay is attached. The retractor 150 has a retractor side attachment face formed thereon to which the stay is attached. The attachment face A1 and the retractor side attachment face are approximately on the same virtual line in side view.

Consequently, vehicle body rear structure 1 reduces deformation caused in the attachment face A1 of the bracket 180 due to a load inputted from the retractor 150 to the bracket 180.

According to the vehicle body rear structure 1, the bracket 180 further has: a first connecting face B1 formed on the one end portion and connected to the wheel house reinforcing member; and a second connecting face B2 formed on the other portion and connected to the rear wheel house. Ridgelines C3, C4, C7, and C8 each having a linear shape are defined between the attachment face A1 and the first connecting face B1 and/or between the attachment face A1 and the second connecting face B2.

Consequently, vehicle body rear structure 1 suitably distributes the load transmitted from the retractor 150 to the bracket 180 to the wheel house reinforcing member and to the rear wheel house 70. This makes it possible to reduce the weight of the bracket 180.

According to the vehicle body rear structure 1, the wheel house reinforcing member includes: a side wall portion extending upward from the rear wheel house; and an upper wall portion extending in the vehicle forward direction or in the vehicle rearward direction from an upper end portion of the side wall portion. The first connecting face B1 is connected to the upper wall portion. The one end portion of the bracket 180 has the first connecting face B1 and a third connecting face B3 connected to the side wall portion.

Consequently, vehicle body rear structure 1 suitably distributes the load transmitted from the retractor 150 to the bracket 180 to the ridgelines of the wheel house reinforcing member. This improves the performance of supporting the retractor 150 by the bracket 180.

According to the vehicle body rear structure 1, the bracket 180 further has a connecting face including the first connecting face B1, the second connecting face B2, and the third connecting face B3 and connected to the wheel house reinforcing member and to the rear wheel house 70. The connecting face is a continuous face formed so as to surround the entire periphery of the attachment face A1.

Consequently, vehicle body rear structure 1 distributes the load transmitted from the retractor 150 to the bracket 180 to a large area in all directions. This makes it possible to reduce the weight of the bracket 180.

According to the vehicle body rear structure 1, the attachment face A1 has an approximately same vehicle width direction dimension as a vehicle width direction dimension of the stay.

Consequently, vehicle body rear structure 1 reduces deformation caused in the attachment face A1 due to a load inputted from the retractor 150 to the bracket 180.

According to the vehicle body rear structure 1, the attachment face A1 has vehicle width direction opposite edge portions where ridgelines C1 and C2 each having a linear shape and extending in a direction in which the stay extends are formed.

Consequently, vehicle body rear structure 1 reduces deformation caused in the attachment face A1 due to a load inputted from the retractor 150 to the bracket 180.

Although an embodiment of the present invention has been described above, it is to be understood that the present invention is not limited only to the above-described embodiment and the embodiment can be modified as appropriate within the range not departing from the gist of the invention. For example, the bracket 180 may be configured such that a rear end portion of the bracket 180 is connected to the wheel house upper part reinforcing member 80, and the other portion, including a front end portion, of the bracket 180 is connected to the rear wheel house 70.

What is claimed is:

1. A vehicle body rear structure comprising:
a rear wheel house;
a rear cross member located on a vehicle width direction inner side of a lower portion of the rear wheel house and extending in a vehicle width direction;
a pillar extending upward from an upper portion of the rear wheel house;
a wheel house reinforcing member extending along the rear wheel house and connecting between the rear cross member and the pillar;
a retractor functioning as a seat belt winding device;
a bracket configured to fix the retractor to a vehicle body; and
a stay connecting between the bracket and the retractor,
wherein the bracket has one end portion connected to the wheel house reinforcing member,
wherein the bracket has an other portion extending from the one end portion in a vehicle forward direction or in a vehicle rearward direction and connected to the rear wheel house,
wherein the bracket has an attachment face which is formed on the other portion of the bracket and to which the stay is attached,
wherein the retractor has a retractor side attachment face formed thereon to which the stay is attached, and
wherein the attachment face and the retractor side attachment face are approximately on a same virtual line in side view.

2. The vehicle body rear structure according to claim 1, wherein the bracket further has:
a first connecting face formed on the one end portion and connected to the wheel house reinforcing member; and
a second connecting face formed on the other portion and connected to the rear wheel house,
wherein a ridgeline having a linear shape is defined between the attachment face and the first connecting face and/or between the attachment face and the second connecting face.

3. The vehicle body rear structure according to claim 2, wherein the wheel house reinforcing member comprises:
a side wall portion extending upward from the rear wheel house; and
an upper wall portion extending in the vehicle forward direction or in the vehicle rearward direction from an upper end portion of the side wall portion,
wherein the first connecting face is connected to the upper wall portion, and
wherein the one end portion of the bracket has the first connecting face and a third connecting face connected to the side wall portion.

4. The vehicle body rear structure according to claim 3, wherein the bracket has a connecting face comprising the first connecting face, the second connecting face, and the third connecting face and connected to the wheel house reinforcing member and to the rear wheel house, and
wherein the connecting face is a continuous face formed so as to surround an entire periphery of the attachment face.

5. The vehicle body rear structure according to claim 1, wherein the attachment face has an approximately same vehicle width direction dimension as a vehicle width direction dimension of the stay.

6. The vehicle body rear structure according to claim 1, wherein the attachment face has vehicle width direction opposite edge portions where ridgelines each having a linear shape and extending in an direction in which the stay extends are formed.

7. The vehicle body rear structure according to claim 1, further comprising a damper base disposed on a vehicle outer side of the rear wheel house,
wherein the other portion of the bracket is connected to the damper base via the rear wheel house.

* * * * *